(12) United States Patent
Kato et al.

(10) Patent No.: US 12,180,605 B2
(45) Date of Patent: Dec. 31, 2024

(54) VOLATILE ORGANIC COMPOUND RECOVERY DEVICE AND RECOVERY METHOD

(71) Applicant: MAZDA MOTOR CORPORATION, Hiroshima (JP)

(72) Inventors: Yu Kato, Hiroshima (JP); Masafumi Shinoda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 812 days.

(21) Appl. No.: 17/420,360

(22) PCT Filed: Jan. 8, 2020

(86) PCT No.: PCT/JP2020/000328
§ 371 (c)(1),
(2) Date: Jul. 1, 2021

(87) PCT Pub. No.: WO2020/149194
PCT Pub. Date: Jul. 23, 2020

(65) Prior Publication Data
US 2022/0090287 A1 Mar. 24, 2022

(30) Foreign Application Priority Data
Jan. 15, 2019 (JP) .................. 2019-004260

(51) Int. Cl.
*C25D 13/22* (2006.01)
*B01D 53/00* (2006.01)
(Continued)

(52) U.S. Cl.
CPC ........... *C25D 13/22* (2013.01); *B01D 53/002* (2013.01); *B01D 53/265* (2013.01); *C25D 13/04* (2013.01);
(Continued)

(58) Field of Classification Search
CPC ...... C25D 13/22; C25D 13/04; B01D 53/002; B01D 53/265; B01D 2258/06;
(Continued)

(56) References Cited

U.S. PATENT DOCUMENTS 4,261,707 A * 4/1981 Bradshaw .............. B01D 47/05
454/55
5,220,796 A 6/1993 Kearns
(Continued)

FOREIGN PATENT DOCUMENTS

| JP | H05-200227 A | 8/1993 |
|---|---|---|
| JP | H05-214267 A | 8/1993 |
| JP | 2018-091492 A | 6/2018 |

OTHER PUBLICATIONS

International Search Report issued in PCT/JP2020/000328; mailed Mar. 31, 2020.

*Primary Examiner* — John P McCormack
(74) *Attorney, Agent, or Firm* — Studebaker & Brackett PC (57) ABSTRACT

A recovery device for a volatile organic compound is a device for recovering the volatile organic compound in a coating drying oven which dries a coating film of a workpiece coated with a water-soluble coating. The coating drying oven includes: an evaporation zone in which moisture of the workpiece is evaporated; and a curing zone to cure the coating film. The recovery device includes: a first take-out passage for taking out first furnace air in the evaporation zone; a second take-out passage for taking out second furnace air in the curing zone; a mixing chamber configured to mix the first furnace air and the second furnace air to obtain mixed air; and a cooling recovery unit configured to cool the mixed air and recover, as a condensate, the volatile organic compound contained in the mixed air, together with the moisture.

20 Claims, 4 Drawing Sheets

(51) Int. Cl.
*B01D 53/26* (2006.01)
*C25D 13/04* (2006.01)
*F26B 21/04* (2006.01)
*F26B 21/08* (2006.01)

(52) U.S. Cl.
CPC .............. *F26B 21/04* (2013.01); *F26B 21/08* (2013.01); *F26B 2210/12* (2013.01)

(58) Field of Classification Search
CPC .. B01D 2257/708; B01D 53/38; B01D 53/44; B01D 53/74; F26B 21/04; F26B 21/08; F26B 2210/12; F26B 3/04; F26B 15/12; F26B 25/006; F26B 25/06; B05B 16/40; B05C 9/14; B05C 11/10; B05D 3/00; B05D 3/02; B05D 7/24
USPC .............................................. 34/666; 118/61
See application file for complete search history.

(56) References Cited

U.S. PATENT DOCUMENTS

| | | | |
|---|---|---|---|
| 5,319,017 | A | 6/1994 | Uenoyama et al. |
| 6,447,585 | B1* | 9/2002 | Buchholz, Jr. ......... B01D 47/05 |
| | | | 250/435 |
| 11,235,737 | B2* | 2/2022 | Moll ....................... F26B 21/10 |
| 2011/0097482 | A1* | 4/2011 | December ............... B05D 7/572 |
| | | | 524/556 |
| 2018/0172347 | A1* | 6/2018 | Mitomo .................. F26B 23/00 |
| 2019/0323772 | A1 | 10/2019 | Kato et al. |

* cited by examiner

VOLATILE ORGANIC COMPOUND RECOVERY DEVICE AND RECOVERY METHOD

TECHNICAL FIELD

The present disclosure relates to a recovery device and a recovery method of volatile organic compounds in a coating drying oven.

BACKGROUND ART

In a coating process of a vehicle body or other targets, an excessive coating has been recovered to reduce coating loss (see, e.g., Patent Document 1).

CITATION LIST

Patent Document

PATENT DOCUMENT 1: Japanese Unexamined Patent Publication No. H5-214267

SUMMARY OF THE INVENTION

Technical Problems

It is known that a large amount of volatile organic compounds (hereinafter may also be referred to as "VOCs") contained in a coating film evaporate in a drying process in which a coated workpiece is carried into a drying oven for drying (e.g., baking or flashing off) the coating film.

These VOCs have been incinerated, which is problematic in terms of costs as well as the environment, for example, generating a large amount of $CO_2$.

To address the problem, it is an objective of the present disclosure to provide a VOC recovery device and a VOC recovery method that are capable of efficiently recovering VOCs generated in a drying oven and excellent in terms of costs and the environment.

Solution to the Problems

In order to achieve the objective, a recovery device for recovering a volatile organic compound according to a first aspect of the present disclosure is a device for recovering a volatile organic compound in a coating drying oven into which a workpiece coated with a water-soluble coating is carried and which dries a coating film of the workpiece. The coating drying oven includes: an evaporation zone into which the workpiece is carried and in which moisture of the workpiece is evaporated at a furnace temperature ranging from 80° C. to 120° C.; and a curing zone arranged downstream of the evaporation zone so as to cure the coating film at a furnace temperature ranging from 150° C. to 200° C. The device includes: a first take-out passage communicating with the evaporation zone, the first take-out passage being for taking out first furnace air in the evaporation zone; a second take-out passage communicating with the curing zone, the second take-out passage being for taking out second furnace air in the curing zone; a mixing chamber configured to mix the first furnace air and the second furnace air to obtain mixed air; and a cooling recovery unit configured to cool the mixed air and recover, as a condensate, the volatile organic compound contained in the mixed air, together with the moisture.

The coating film on the workpiece that is coated using the water-soluble coating contains a large amount of the moisture and the volatile organic compound. In the evaporation zone with the lower temperature, the moisture contained in the coating film evaporates mainly, and the first furnace air contains a large amount of water vapor. On the other hand, in the curing zone with the high temperature which is arranged downstream of the evaporation zone, the VOC contained in the coating film evaporates mainly, and the second furnace air contains a large amount of the VOC. According to this aspect, the first furnace air in the evaporation zone and the second furnace air in the curing zone are taken out, mixed, and cooled, whereby the VOC can be condensed while being dissolved in the moisture. This configuration allows efficient recovery of the VOC in the coating drying oven. In addition, according to this aspect, since the VOC is recovered as the condensate, there is no need to exhaust gas or place a catalytic oxidation device as required in a typical VOC incineration process, or even in a case where a catalytic oxidation device is provided, the catalytic oxidation device can be reduced in size and a reduced amount of gas is exhausted.

A second aspect is an embodiment of the first aspect. In the second aspect, the cooling recovery unit includes: a cooler configured to cool the mixed air; a heater to which residual air obtained by removing the condensate from the mixed air cooled by the cooler is introduced, the heater being configured to heat the residual air; a return passage for returning, to the coating drying oven, the residual air heated; and a heat pump connecting the cooler and the heater, and configured to supply cold heat for cooling the mixed air to the cooler through heat exchange and supply hot heat for heating the residual air to the heater through heat exchange.

According to this aspect, dry air obtained by cooling the mixed air and condensing, and removing, the moisture and the VOC is heated and returned to the coating drying oven. This configuration reduces an increase in the vapor pressure in the coating drying oven. As a result, the moisture and VOC in the coating film in the coating drying oven evaporate at a higher rate. Accordingly, the coating film of the workpiece can be quickly and efficiently dried in the coating drying oven, which is advantageous in improving the quality. In addition, the heat pump is utilized for cooling the mixed air and heating the air, which reduces the energy loss and is advantageous in energy saving.

A third aspect is an embodiment of the second aspect. In the third aspect, the device includes an additional cooler arranged upstream of the cooler and configured to pre-cool the mixed air.

According to this aspect, the mixed air can be cooled to some extent by the pre-cooling, which facilitates the cooling of the mixed air to a predetermined temperature using the heat pump.

A fourth aspect is an embodiment of the second or third aspect. In the fourth aspect, the cooling recovery unit includes a moisture feeder configured to add additional moisture into the cooling recovery unit.

If the first furnace air contains a small amount of moisture, the cooling recovery unit may be less likely to be capable of securing the moisture sufficient for recovering the VOC. According to this aspect, the additional moisture is added into the cooling recovery unit, which allows efficient recovery of the VOC.

A method of recovering a volatile organic compound according to a fifth aspect of the present disclosure is a method of recovering a volatile organic compound in a coating drying oven into which a workpiece coated with a water-soluble coating is carried and which dries a coating film of the workpiece. The coating drying oven includes: an evaporation zone into which the workpiece is carried in and in which moisture of the workpiece is evaporated at a furnace temperature ranging from 80° C. to 120° C.; and a curing zone arranged downstream of the evaporation zone so as to cure the coating film at a furnace temperature ranging from 150° C. to 200° C. The method includes: a first take-out step of taking out first furnace air in the evaporation zone; a second take-out step of taking out second furnace air in the curing zone; a mixing step of mixing the first furnace air and the second furnace air to obtain mixed air; and a cooling recovery step of cooling the mixed air and recovering, as a condensate, the volatile organic compound contained in the mixed air, together with the moisture.

According to this aspect, the first furnace air and the second furnace air are taken out, mixed, and cooled, whereby the VOC can be condensed while being dissolved in the moisture. This configuration allows efficient recovery of the VOC evaporated in the coating drying oven. In addition, according to this aspect, there is no need to exhaust gas or place a catalytic oxidation device as required in a typical VOC incineration process, or even in a case where a catalytic oxidation device is provided, the catalytic oxidation device can be reduced in size and a reduced amount of gas is exhausted.

A sixth aspect is an embodiment of the fifth aspect. In the sixth aspect, the method further includes: a return step of heating, and returning to the coating drying oven, residual air that has undergone the cooling recovery step and from which the condensate has been removed, wherein the mixed air is cooled and the residual air is heated by a heat pump that uses the mixed air as a heat absorption source and the residual air as a heat dissipation source.

According to this aspect, dry air obtained by cooling the mixed air and condensing, and removing, the moisture and the VOC is heated and returned to the coating drying oven. This configuration reduces an increase in the vapor pressure in the coating drying oven. As a result, the moisture and VOC in the coating film in the coating drying oven evaporate at a higher rate. Accordingly, the coating film of the workpiece can be quickly and efficiently dried in the coating drying oven, which is advantageous in improving the quality. In addition, the heat pump is utilized for cooling the mixed air and heating the air, which reduces the energy loss and is advantageous in energy saving.

A seventh aspect is an embodiment of the sixth aspect. In the seventh aspect, the method further includes pre-cooling the mixed air before the mixed air is cooled by the heat pump.

According to this aspect, the mixed air can be cooled to some extent by the pre-cooling, which facilitates the cooling of the mixed air to a predetermined temperature using the heat pump.

An eighth aspect is an embodiment of the seventh aspect. In the eighth aspect, in the return step, the residual air heated by the heat pump is further heated and returned to the coating drying oven.

The method according to this aspect facilitates the adjustment of the temperature of the residual air to be returned to the coating drying oven. The method also accelerates the temperature rise of the coating drying oven at the start of the operation.

A ninth aspect is an embodiment of any one of the sixth to eighth aspects. In the ninth aspect, the moisture contained in the mixed air has a weight absolute humidity of 21 g/kg or more, the mixed air contains the volatile organic compound at a concentration of 500 ppmC or more, the moisture contained in the residual air has a weight absolute humidity of 18 g/kg or less, and the residual air contains the volatile organic compound at a concentration of 80 ppmC or less.

The aspect of the present disclosure allows efficient recovery of the VOC together with the moisture in the cooling recovery step, and thus provides the method of recovering the volatile organic compound that is excellent in terms of costs and the environment.

A tenth aspect is an embodiment of any one of the fifth to ninth aspects. In the tenth aspect, the water-soluble coating is an electrodeposition coating, and the workpiece is carried into the coating drying oven after being subjected to a rinsing step in which the workpiece subjected to electrodeposition using the electrodeposition coating is immersed into rinse water and rinsed.

After the electrodeposition, dip rinsing may be performed in which the workpiece is immersed in the rinse water and rinsed. According to this aspect, the coating film of the workpiece carried into the evaporation zone contains a large amount of moisture derived from the rinse water. The first furnace air therefore contains a large amount of moisture, which allows efficient recovery of the VOC using the moisture.

Advantages of the Invention

As described above, according to the present disclosure, the first furnace air in the evaporation zone and the second furnace air in the curing zone are taken out, mixed, and cooled, whereby the VOC can be condensed while being dissolved in the moisture. This configuration allows efficient recovery of the VOC in the coating drying oven. In addition, according to this aspect, since the VOC is recovered as the condensate, there is no need to exhaust gas or place a catalytic oxidation device as required in a typical VOC incineration process, or even in a case where a catalytic oxidation device is provided, the catalytic oxidation device can be reduced in size and a reduced amount of gas is exhausted.

DETAILED DESCRIPTION

Embodiments of the present disclosure will now be described in detail with reference to the drawings. The following description of preferred embodiments is merely an example in nature, and is not intended to limit the scope, applications or use of the present disclosure.

First Embodiment

<Configuration of Electrodeposition Coating Line>

Figure 1:
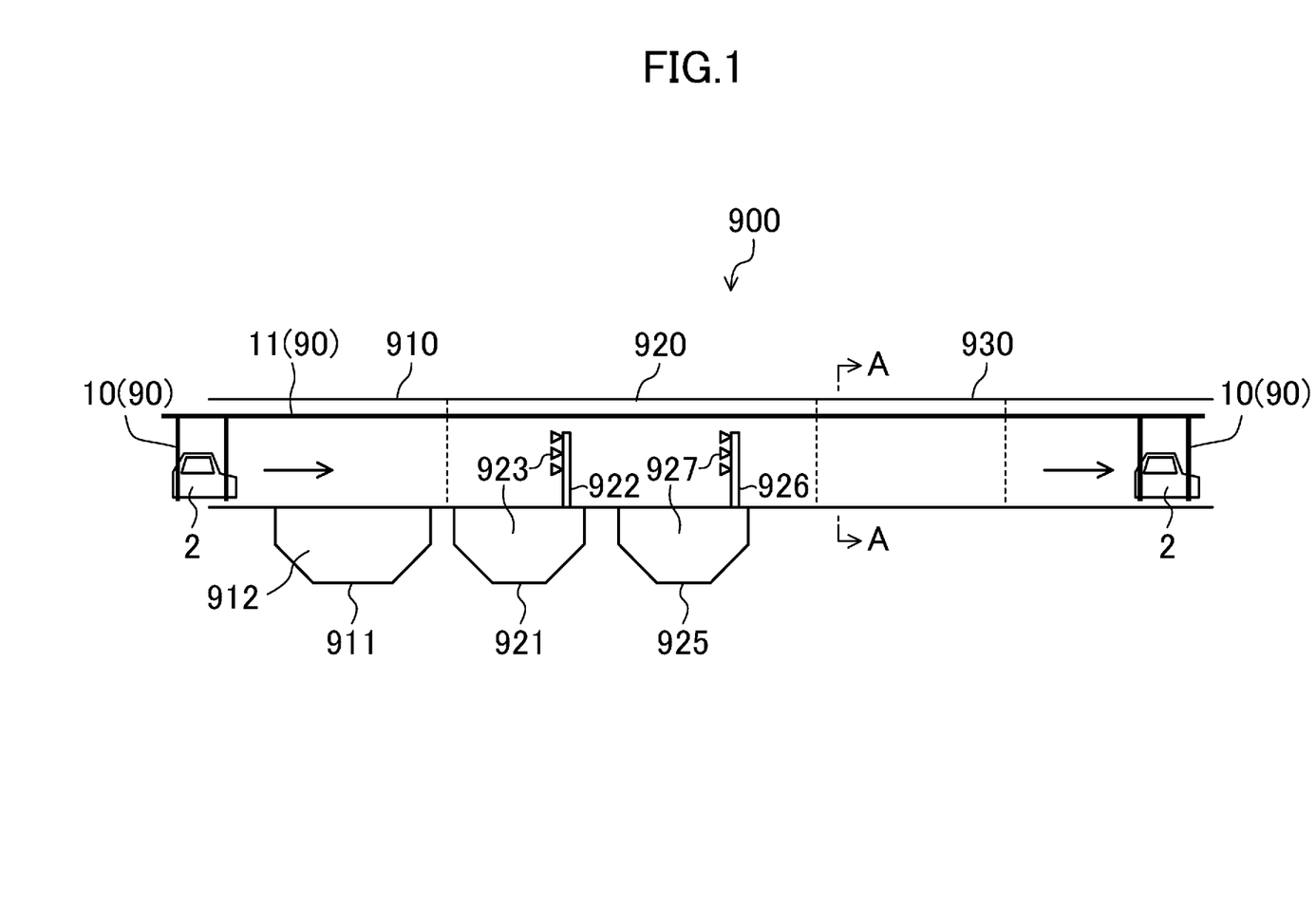
FIG. 1 is a diagram illustrating an example of an electrodeposition coating line.

A workpiece 2 in an electrodeposition coating line 900 shown in FIG. 1 is an automobile body. The electrodeposition coating line 900 includes an electrodeposition station 910, a rinsing station 920, and a drying station 930 which are arranged sequentially from the upstream side, and a hanging conveyor 90 that guides the workpiece 2 to the stations 910, 920, and 930 sequentially.

In this specification, the "upstream side" and the "downstream side" are based on the directions in which the workpiece 2 flows in the electrodeposition coating line 900, and based on the directions in which air flows in a circulation path 6 which will be described later.

<Hanging Conveyor>

Figure 2:
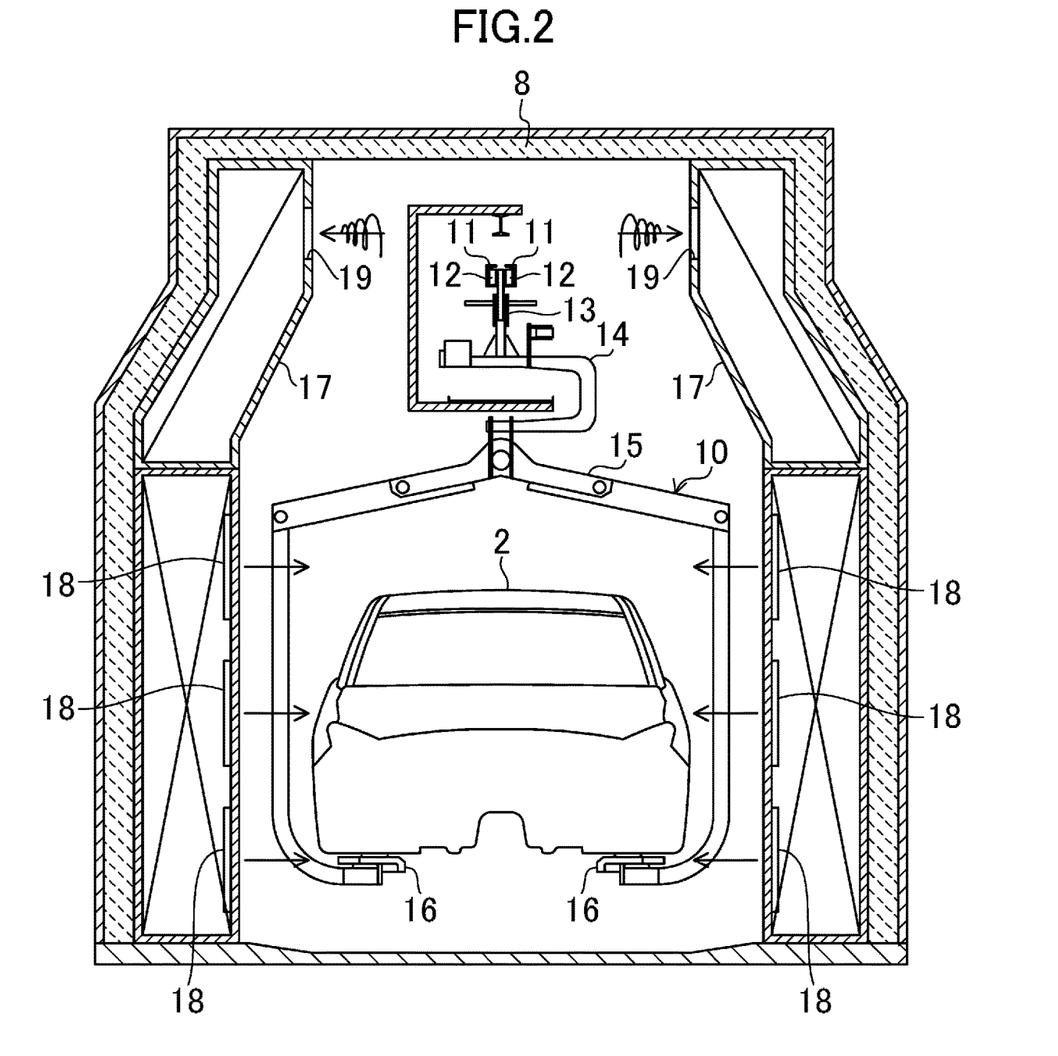
FIG. 2 is a diagram illustrating a schematic cross-sectional view taken along line A-A in FIG. 1.

FIG. 2 is a diagram illustrating a schematic cross-sectional view of a coating drying oven 100, which will be described later, at the drying station 930. As shown in FIGS. 1 and 2, the hanging conveyor 90 is an overhead conveyor including guide rails 11 and front and rear trolleys 13. The guide rails 11 extend along the electrodeposition coating line 900. The front and rear trolleys 13 are engaged with the guide rails 11 by rollers 12 and move along the guide rails 11. A hanger 10 is hanging on the trolleys 13. The hanger 10 includes front and rear portal frames 15 hanging from the trolleys 13 via a C-neck 14 for supporting the workpiece 2 from both sides. Each portal frame 15 has, at its lower end, a workpiece receiver 16. The workpiece 2 is hung on the hanger 10 and carried to the stations 910, 920, and 930 sequentially. Through the electrodeposition, rinsing, and drying steps at the respective stations 910, 920, and 930, the electrodeposition coating of the workpiece 2 is completed.

<Electrodeposition Station>

The electrodeposition station 910 includes an electrodeposition tank 911 storing an electrodeposition coating 912. The workpiece 2 is subjected to chemical conversion treatment, for example, and then immersed in the electrodeposition tank 911. Cationic electrodeposition coating is then performed using the workpiece 2 as a cathode, and a counter electrode (not shown) within the electrodeposition tank 911 as an anode (i.e., the electrodeposition step).

<Rinsing Station>

At the rinsing station 920, the workpiece 2 with the electrodeposition coating 912 is subjected to dip rinsing and subsequent spray rinsing with UF filtrate 923 (i.e., rinse water), and dip rinsing and subsequent spray rinsing with industrial water 927 (i.e., rinse water) (i.e., the rinsing step).

For this purpose, the rinsing station 920 includes: a UF dipping tank 921 storing the UF filtrate 923 and a UF spray nozzle 922 for spraying the UF filtrate 923; and an industrial water dipping tank 925 storing the industrial water 927 and an industrial water spray nozzle 926 for spraying the industrial water 927, which are arranged sequentially from the upstream side. The workpiece 2 is rinsed through the immersion into the UF filtrate 923 or the industrial water 927 stored in the dipping tank 921 or 925, and then further rinsed by the UF filtrate 923 or the industrial water 927 sprayed through the spray nozzle 922 or 926.

The UF filtrate 923 is obtained by ultrafiltration (also referred to as "UF") of the electrodeposition coating 912 in the electrodeposition tank 911. For this purpose, the electrodeposition tank 911 includes a UF device and a UF tank which are not shown. The electrodeposition coating 912 in the electrodeposition tank 911 is subjected to the ultrafiltration by the UF device to reduce its loss. This UF filtrate 923 is stored in the UF tank. The UF filtrate 923 stored in the UF tank is supplied to the UF spray nozzle 922, and the sprayed UF filtrate 923 is collected in the UF dipping tank 921. Overflow water from the UF dipping tank 921 is collected in the electrodeposition tank 911.

<Drying Station>

Figure 3:
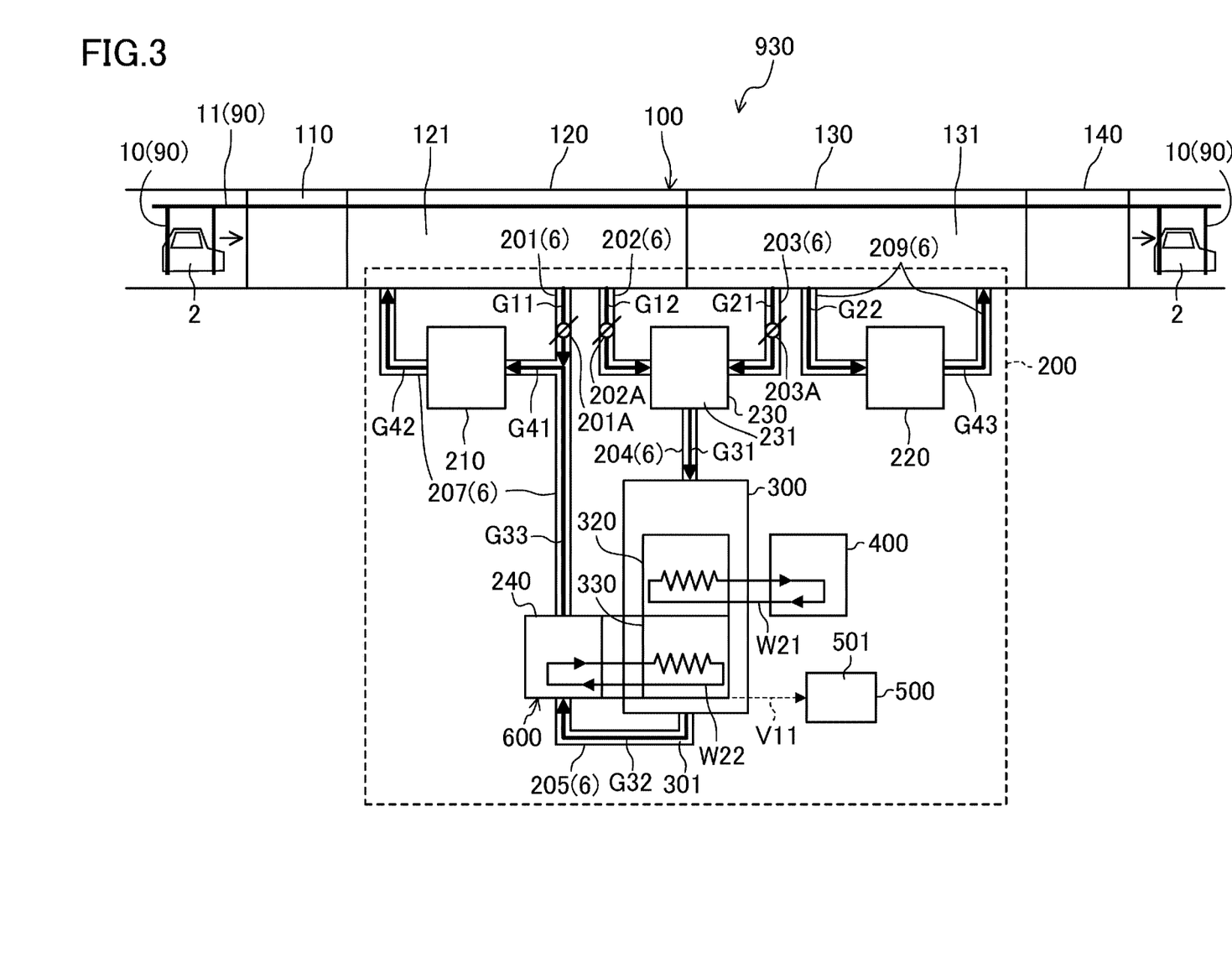
FIG. 3 is a diagram illustrating a coating drying oven including a recovery device according to a first embodiment.

As shown in FIG. 3, the drying station 930 includes the coating drying oven 100, and a recovery device 200 according to this embodiment which is arranged in the coating drying oven 100 to recover volatile organic compounds (also referred to as "VOCs").

<Coating Drying Oven>

Into the coating drying oven 100, the workpiece 2 that has undergone the electrodeposition and rinsing steps is carried to dry the coating film of the workpiece 2 (i.e., the drying step). The coating drying oven 100 includes an inlet 110, an evaporation zone 120, a curing zone 130, and an outlet 140 which are arranged sequentially from the upstream side. The evaporation zone 120 is for mainly evaporating the moisture contained in the coating film. The curing zone 130 is for curing the coating film by mainly evaporating the VOCs contained in the coating film. After passing through the rinsing station 920, the workpiece 2 is carried into the inlet 110 of the coating drying oven 100 and sequentially passes through the evaporation zone 120 and the curing zone 130, and then carried outside the coating drying oven 100 through the outlet 140.

As shown in FIG. 2, the coating drying oven 100 has, on its facing inner walls 17 in the evaporation zone 120 and the curing zone 130, nozzle boxes 18 for blowing warm air supplied from the circulation path 6, which will be described later, toward the workpiece 2 on the hanger 10. In an upper portion of each inner wall 17, an air suction port 19 is open to discharge the air in the coating drying oven 100 to the circulation path 6 through an actuation of a circulation fan (not shown). The coating drying oven 100 has, on its walls, a heat insulating material 8.

Here, the furnace temperature in the evaporation zone 120 is maintained at a temperature ranging from 80° C. to 120° C., for example. On the other hand, the furnace temperature in the curing zone 130 is maintained at a temperature ranging from 150° C. to 200° C., for example. That is, the furnace temperature in the curing zone 130 is maintained at a temperature near the boiling point of VOCs to promote the curing of the coating film. The furnace temperature in the evaporation zone 120 upstream of the curing zone 130 is lower than in the curing zone 130, and maintained at a temperature near the boiling point of moisture.

The coating film of the workpiece 2 that has undergone the electrodeposition and rinsing steps contains a large amount of VOCs contained in the electrodeposition coating 912 and a large amount of the moisture. In the evaporation zone 120 having the low temperature and located upstream, the moisture contained in the coating film of the workpiece 2 is mainly evaporated in advance. After the moisture has been sufficiently evaporated in the evaporation zone 120, the VOCs contained in the coating film are mainly evaporated to cure the coating film in the curing zone 130 having the high temperature and located downstream of the evaporation zone 120.

If the workpiece 2 that has undergone the rinsing step is directly carried into the curing zone 130, the moisture and VOCs contained in the coating film evaporate at once. Thus, an excessive amount of components evaporates from the coating film, which may degrade the quality of the coating film, such as formation of voids.

The evaporation zone 120 and the curing zone 130 are provided to evaporate the moisture and the VOCs in stages, thereby making it possible to provide a coating with higher quality. In the above configuration, first furnace air 121 in the evaporation zone 120 contains a large amount of water vapor. On the other hand, second furnace air 131 contains a large amount of VOCs.

The first furnace air 121 in the evaporation zone 120 has a weight absolute humidity (hereinafter may also be simply referred to as "humidity") ranging, for example, from 20 g/kg to 25 g/kg. On the other hand, the humidity of the second furnace air 131 in the curing zone 130 is lower than the humidity of the first furnace air 121, and ranges, for example, from 15 g/kg to 20 g/kg.

The VOC concentration in the first furnace air 121 ranges, for example, from about 60 ppmC to about 100 ppmC. On the other hand, the VOC concentration of the second furnace air 131 is higher than the VOC concentration of the first furnace air 121, and ranges, for example, from about 600 ppmC to about 1000 ppmC.

<Recovery Device>

The recovery device 200 is for recovering the VOCs in the coating drying oven 100.

As shown in FIG. 3, the recovery device 200 includes the circulation path 6, a mixing chamber 230, a cooling recovery unit 300, a heat pump 600, a second heater 210, a third heater 220, a cooling tower 400, and a tank 500. The circulation path 6 takes out air in the coating drying oven 100 and circulates the air. The mixing chamber 230, the cooling recovery unit 300, the heat pump 600, the second heater 210, and the third heater 220 are arranged on the circulation path 6. The cooling tower 400 and the tank 500 are connected to the cooling recovery unit 300.

The circulation path 6 includes a first take-out passage 202, a second take-out passage 203, a take-out passage 201 from the evaporation zone, a first communication passage 204, a second communication passage 205, a return passage 207 to the evaporation zone, and a circulation passage 209 in the curing zone.

The recovery device 200 recovers the VOCs through the following steps. Specifically, the steps include: a first take-out step of taking out the first furnace air 121 in the evaporation zone 120; a second take-out step of taking out the second furnace air 131 in the curing zone 130; a mixing step of mixing the first furnace air 121 and the second furnace air 131 in the mixing chamber 230 to obtain mixed air 231; a cooling recovery step of cooling the mixed air 231 in the cooling recovery unit 300 and recovering, as condensate 501, the VOCs contained in the mixed air 231, together with the moisture; and a return step of heating, and returning to the coating drying oven 100, residual air 301 that has undergone the cooling recovery step and from which the condensate 501 has been removed. Note that the recovery device 200 according to this embodiment may perform a curing zone circulation step together with or separately from the recovery of the VOCs. In the curing zone circulation step, the second furnace air 131 in the curing zone 130 is taken out, heated by the third heater 220, and returned to the curing zone 130 as it is. Now, a method of recovering the VOCs through the above steps will be described together with the description of the components of the recovery device 200.

—First Take-Out Passage—

The first take-out passage 202 communicates with the evaporation zone 120 via an air suction port 19 in the evaporation zone 120. As indicated by an arrow G12, the first furnace air 121 in the evaporation zone 120 is taken out through the first take-out passage 202 (i.e., the first take-out step). The first take-out passage 202 has a flow rate adjustment valve 202A, which adjusts the flow rate of the first furnace air 121.

—Second Take-Out Passage—

The second take-out passage 203 communicates with the curing zone 130 via an air suction port 19 in the curing zone 130. As indicated by an arrow G21, the second furnace air 131 in the curing zone 130 is taken out through the second take-out passage 203 (i.e., the second take-out step). The second take-out passage 203, too, has a flow rate adjustment valve 203A, which adjusts the flow rate of the second furnace air 131.

—Mixing Chamber—

The first furnace air 121 guided from the evaporation zone 120 through the first take-out passage 202, and the second furnace air 131 guided from the curing zone 130 through the second take-out passage 203 are introduced into the mixing chamber 230 and mixed (i.e., the mixing step). The mixed air 231 generated in the mixing chamber 230 is then sent to the cooling recovery unit 300 through the first communication passage 204 as indicated by an arrow G31.

—Cooling Recovery Unit—

The cooling recovery unit 300 cools the mixed air 231 and recovers, as the condensate 501, the VOCs contained in the mixed air 231, together with the moisture (i.e., the cooling recovery step). The cooling recovery unit 300 includes a first cooler 320 (i.e., an additional cooler) and a second cooler 330 (i.e., a cooler).

The first cooler 320 is, for example, a cooling coil made of metal, and is connected to the cooling tower 400 provided outside the electrodeposition coating line 900. The mixed air 231 is then pre-cooled using coolant W21 as a refrigerant. Accordingly, the mixed air 231 can be cooled to some extent by the pre-cooling before being cooled by the second cooler 330, which facilitates the cooling of the mixed air 231 to a predetermined temperature using the second cooler 330.

The mixed air 231 pre-cooled by the first cooler 320 is further cooled by the second cooler 330. Like the first cooler 320, the second cooler 330 is, for example, a cooling coil made of metal, and constitutes an evaporator of the heat pump 600 which will be described later. When the mixed air 231 is cooled by the second cooler 330, part of the VOCs contained in the mixed air 231 are condensed together with the moisture. The resultant condensate 501 is removed from the mixed air 231 and collected in the tank 500 as indicated by a broken arrow V11 in FIG. 3. For example, the VOCs are separated from the condensate 501 in the tank 500 and reused.

The mixed air 231 may contain a tar component generated by oxidative decomposition of the coating component or other causes. Part of the tar component may also be removed as the condensate 501 from the mixed air 231. The cooling recovery unit 300 may include a filter or other means for removing the tar component from the mixed air 231.

The residual air 301 after cooling the mixed air 231 and removing the condensate 501 is sent to a first heater 240 through the second communication passage 205 as indicated by an arrow G32 and heated (i.e., the return step).

The second cooler 330 and the first heater 240 are connected by the heat pump 600. Specifically, the heat pump 600 is of a vapor compression type circulating a refrigerant such as $CO_2$, a fluorocarbon medium, or water in the order of a compressor, a condenser, an expansion valve, and an evaporator. The evaporator of the heat pump 600 constitutes the second cooler 330 that cools the mixed air 231 through heat exchange. On the other hand, the condenser of the heat pump 600 constitutes the first heater 240 that heats the residual air 301 through heat exchange. Accordingly, the heat pump 600 supplies cold heat for cooling the mixed air 231 to the second cooler 330 through heat exchange, and supplies hot heat for heating the residual air 301 to the first heater 240 through heat exchange. In other words, the heat pump 600 uses the mixed air 231 as a heat absorption source and the residual air 301 as a heat dissipation source. In FIG. 3, reference character W22 denotes the flow of the refrigerant.

The residual air 301 heated by the first heater 240 is returned to the evaporation zone 120 through the return passage 207 to the evaporation zone as indicated by arrows G33, G41, and G42 (i.e., the return step). Note that the return passage 207 to the evaporation zone communicates with the evaporation zone 120 via the nozzle boxes 18. That is, the warm air of the residual air 301 is blown out into the evaporation zone 120 via the nozzle boxes 18.

In an intermediate portion of the return passage 207 to the evaporation zone, the second heater 210 is placed which further heats the residual air 301 heated by the first heater 240, as necessary. A gas burner is used as the second heater 210, and gas fuel and outside air are supplied to the second heater 210.

The evaporation zone 120 includes, in addition to the first take-out passage 202, the take-out passage 201 from the evaporation zone for taking out the first furnace air 121. The take-out passage 201 from the evaporation zone communicates with the return passage 207 to the evaporation zone at a position upstream of the second heater 210. The take-out passage 201 from the evaporation zone has a flow rate adjustment valve 201A. By opening and closing the flow rate adjustment valve 201A, part of the first furnace air 121 can be sent directly to, and heated by, the second heater 210 as necessary, as indicated by an arrow G11, and returned to the evaporation zone 120. Accordingly, the second heater 210 can be used for purposes such as raising the temperature of the air in the evaporation zone 120 earlier at the start of the operation, and adjusting the temperature of the air in the evaporation zone 120.

The curing zone 130 includes, in addition to the second take-out passage 203, the circulation passage 209 in the curing zone. The circulation passage 209 includes the third heater 220 in its intermediate portion. The circulation passage 209 in the curing zone is for taking out part of the second furnace air 131 from the curing zone 130, and for heating the air with the third heater 220 and returning the heated air to the curing zone 130 as indicated by arrows G22 and G43. With this configuration, the third heater 220 can be used for purposes such as raising the temperature of the air in the curing zone 130 earlier at the start of the operation, and adjusting the temperature of the air in the curing zone 130 (i.e., the curing zone circulation step).

—Temperature, Humidity, and VOC Concentration of Air in Circulation Path—

In the mixing chamber 230, the first furnace air 121 and the second furnace air 131 are mixed so that, for example, the resultant mixed air 231 has a humidity of 21 g/kg or more, preferably ranging from 21 g/kg to 23 g/kg, and contains the VOCs at a concentration of 500 ppmC or more, preferably ranging from 500 ppmC to 700 ppmC. Accordingly, when the mixed air 231 is cooled in the cooling recovery unit 300, part of the VOCs in the mixed air 231 can be dissolved in the moisture and efficiently removed as the condensate 501. The mixed air 231 in the mixing chamber 230 may have a temperature ranging from about 100° C. to about 120° C., for example.

The mixed air 231 is cooled by the first cooler 320 to a temperature ranging from about 40° C. to about 60° C. The mixed air 231 cooled by the first cooler 320 is then cooled by the second cooler 330 using the heat pump 600 to a temperature at which the moisture and VOCs in the mixed air 231 are condensed, for example, to a temperature ranging from about 10° C. to about 30° C. Accordingly, part of the VOCs in the mixed air 231 is condensed together with part of the moisture and removed as the condensate 501.

The residual air 301 remaining after removal of the condensate 501 has a humidity of, for example, 18 g/kg or less, preferably ranging from 13 g/kg to 18 g/kg and contains the VOCs at a concentration of, for example, 80 ppmC or less, preferably ranging from 30 ppmC to 80 ppmC.

After that, the residual air 301 is heated in stages by the first heater 240 and the second heater 210 of the heat pump 600 and returned to the evaporation zone 120. Specifically, for example, the residual air 301 is heated to the temperature ranging from about 50° C. to about 80° C. by the first heater 240, heated to the temperature ranging from about 80° C. to about 100° C. by the second heater 210, and returned to the evaporation zone 120.

<Advantages>

As described above, in the recovery device 200 according to this embodiment, the first furnace air 121 in the evaporation zone 120 and the second furnace air 131 in the curing zone 130 are taken out, mixed, and cooled, whereby the VOCs can be condensed while being dissolved in the moisture. Accordingly, the VOCs in the coating drying oven 100 can be efficiently recovered, and the typical exhaust equipment for taking out the air in the coating drying oven 100 and burning and removing the VOCs using a catalytic burner becomes unnecessary or can be simplified.

In addition, the humidity of the residual air 301 to be returned to the evaporation zone 120 is lowered due to the cooling and the removal of the condensate 501 in the cooling recovery unit 300. Dry warm air is thus supplied to the evaporation zone 120. This reduces an increase in the vapor pressure in the coating drying oven 100 and increases the evaporation rate of the moisture and VOCs in the coating film in the coating drying oven 100. Accordingly, the coating film of the workpiece 2 can be quickly and efficiently dried in the coating drying oven 100, which is advantageous in improving the quality of the coating film. In addition, the heat pump 600 is utilized for cooling the mixed air 231 and heating the residual air 301, which reduces the energy loss and is advantageous in energy saving. The surface temperature of the hanger 10 carried into the coating drying oven 100 ranges from about 27° C. to about 28° C. When the dried residual air 301 is supplied to the coating drying oven 100, the dew point temperature of the air in the coating drying oven 100 becomes lower than the surface temperature of the hanger 10. This reduces the dew condensation on the hanger 10 and deterioration in the quality of the coating film due to the drop of the dew condensation water onto the workpiece 2.

Second Embodiment

Now, another embodiment according to the present disclosure will be described in detail. In the description of this embodiment, the same reference characters as those in the first embodiment are used to represent equivalent elements, and the detailed explanation thereof will be omitted.

Figure 4:
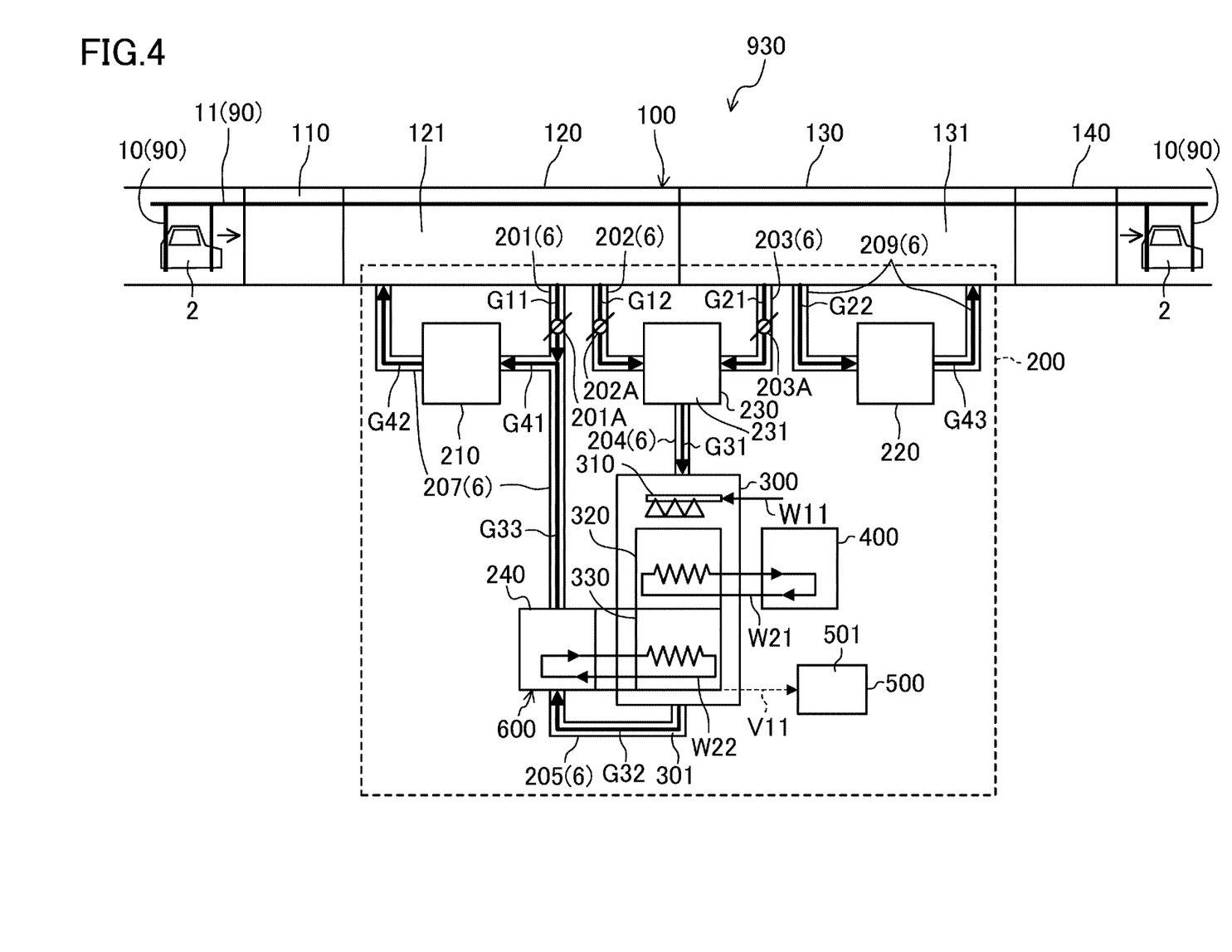
FIG. 4 is a diagram corresponding to FIG. 3 and illustrating a coating drying oven including a recovery device according to a second embodiment.

The recovery device 200 is also applicable to a drying oven in a coating process including, as a rinsing step, no dip rinsing but only spray rinsing, for example, or in a coating process without any rinsing step. In this case, the mixed air 231 may have a humidity less than 20 g/kg, for example. The humidity of the mixed air 231 is therefore insufficient, which may make it difficult to efficiently recover the VOCs. Accordingly, as shown in FIG. 4, the cooling recovery unit 300 may include a moisture feeder 310 of, for example, a spray nozzle type for adding additional moisture into the cooling recovery unit 300. Industrial water or other moisture is supplied to the moisture feeder 310 from the outside of the recovery device 200, for example, as indicated by an arrow W11. It is therefore possible to add moisture necessary for efficiently recovering the VOCs to the mixed air 231.

Other Embodiments

The recovery device 200 is applicable not only to a coating drying oven in an electrodeposition coating line but to a coating drying oven in other types of coating lines using a water-soluble coating. In addition, the recovery device 200 is applicable not only to a coating drying oven for baking but also to a coating drying oven for flash-off. Specifically, for example, the recovery device 200 can also be used in a coating drying oven for intermediate coating or top coating using a water-soluble coating after electrodeposition coating.

In addition, the cooling recovery unit 300 may include a plurality of coolers for pre-cooling to cool the mixed air 231 in multiple stages.

The circulation path 6 may include a plurality of heat pumps 600 to cool the mixed air 231 and heat the residual air 301 in multiple stages. In this case, the heat pumps that use different refrigerants in accordance with the temperature of the mixed air 231 may be disposed. Specifically, the mixed air 231 with a higher temperature may be cooled by a heat pump using, as a refrigerant, $CO_2$ suitable for heat absorption and dissipation on the higher temperature side. On the other hand, the mixed air 231 with a lower temperature may be cooled by a heat pump using, as a refrigerant, a fluorocarbon-based medium suitable for heat absorption and dissipation on the lower temperature side. Accordingly, the mixed air 231 can be efficiently cooled and heated.

The circulation path 6 may include only one of the take-out passage 201 from the evaporation zone or the circulation passage 209 in the curing zone, or may include none of these passages.

The second cooler 330 of the cooling recovery unit 300 may be another cooler using, for example, a chiller (i.e., a coolant circulator) instead of the evaporator of the heat pump 600. The first heater 240 may be another heater such as a gas burner instead of the condenser of the heat pump 600. In addition, the recovery device 200 may be without a return step for the residual air 301.

The workpiece 2 is not limited to an automobile body, and may be an automobile component such as a bumper (made of plastic), a filler lid (i.e., the lid of a filler opening), a side mirror, an antenna, or a spoiler; or a coated product made of metal and/or resin other than the automobile component.

DESCRIPTION OF REFERENCE CHARACTERS

2 Workpiece
6 Circulation Path
100 Coating Drying Oven
120 Evaporation Zone
121 First Furnace Air
130 Curing Zone
131 Second Furnace Air
200 Recovery Device
201 Take-Out Passage From Evaporation Zone
202 First Take-Out Passage
203 Second Take-Out Passage
204 First Communication Passage
205 Second Communication Passage
207 Return Passage to Evaporation Zone
209 Circulation Passage in Curing Zone
210 Second Heater
220 Third Heater
230 Mixing Chamber
231 Mixed Air
240 First Heater
300 Cooling Recovery Unit
301 Residual Air
310 Moisture Feeder
320 First Cooler
330 Second Cooler
501 Condensate
600 Heat Pump
900 Electrodeposition Coating Line
910 Electrodeposition Station
920 Rinsing Station
930 Drying Station

The invention claimed is:

1. A device for recovering a volatile organic compound in a coating drying oven into which a workpiece coated with a water-soluble coating is carried and which dries a coating film of the workpiece,
the coating drying oven including:
an evaporation zone into which the workpiece is carried and in which moisture of the workpiece is evaporated at a furnace temperature ranging from 80° C. to 120° C.; and
a curing zone arranged downstream of the evaporation zone so as to cure the coating film at a furnace temperature ranging from 150° C. to 200° C., the device comprising:
a first take-out passage communicating with the evaporation zone, the first take-out passage being for taking out first furnace air in the evaporation zone;
a second take-out passage communicating with the curing zone, the second take-out passage being for taking out second furnace air in the curing zone;
a mixing chamber configured to mix the first furnace air and the second furnace air to obtain mixed air; and
a cooling recovery unit configured to cool the mixed air and recover, as a condensate, the volatile organic compound contained in the mixed air, together with the moisture.

2. The device of claim 1, wherein
the cooling recovery unit includes:
a cooler configured to cool the mixed air;
a heater to which residual air obtained by removing the condensate from the mixed air cooled by the cooler is introduced, the heater being configured to heat the residual air;
a return passage for returning, to the coating drying oven, the residual air heated; and
a heat pump connecting the cooler and the heater, and configured to supply cold heat for cooling the mixed air to the cooler through heat exchange and supply hot heat for heating the residual air to the heater through heat exchange.

3. The device of claim 2, further comprising:
an additional cooler arranged upstream of the cooler and configured to pre-cool the mixed air.

4. The device of claim 3, wherein
the cooling recovery unit includes a moisture feeder configured to add additional moisture into the cooling recovery unit.

5. The device of claim 1, wherein
the cooling recovery unit includes a moisture feeder configured to add additional moisture into the cooling recovery unit.

6. A method of recovering a volatile organic compound in a coating drying oven into which a workpiece coated with a water-soluble coating is carried and which dries a coating film of the workpiece,
the coating drying oven including:
an evaporation zone into which the workpiece is carried and in which moisture of the workpiece is evaporated at a furnace temperature ranging from 80° C. to 120° C.; and
a curing zone arranged downstream of the evaporation zone so as to cure the coating film at a furnace temperature ranging from 150° C. to 200° C., the method comprising:
a first take-out step of taking out first furnace air in the evaporation zone;
a second take-out step of taking out second furnace air in the curing zone;
a mixing step of mixing the first furnace air and the second furnace air to obtain mixed air; and
a cooling recovery step of cooling the mixed air and recovering, as a condensate, the volatile organic compound contained in the mixed air, together with the moisture.

7. The method of claim 6, further comprising:
a return step of heating, and returning to the coating drying oven, residual air that has undergone the cooling recovery step and from which the condensate has been removed, wherein
the mixed air is cooled and the residual air is heated by a heat pump that uses the mixed air as a heat absorption source and the residual air as a heat dissipation source.

8. The method of claim 7, further comprising:
pre-cooling the mixed air before the mixed air is cooled by the heat pump.

9. The method of claim 8, wherein
in the return step, the residual air heated by the heat pump is further heated and returned to the coating drying oven.

10. The method of claim 9, wherein
the moisture contained in the mixed air has a weight absolute humidity of 21 g/kg or more,
the mixed air contains the volatile organic compound at a concentration of 500 ppmC or more,
the moisture contained in the residual air has a weight absolute humidity of 18 g/kg or less, and
the residual air contains the volatile organic compound at a concentration of 80 ppmC or less.

11. The method of claim 10, wherein
the water-soluble coating is an electrodeposition coating, and
the workpiece is carried into the coating drying oven after being subjected to a rinsing step in which the workpiece subjected to electrodeposition using the electrodeposition coating is immersed into rinse water and rinsed.

12. The method of claim 6, wherein
the water-soluble coating is an electrodeposition coating, and
the workpiece is carried into the coating drying oven after being subjected to a rinsing step in which the workpiece subjected to electrodeposition using the electrodeposition coating is immersed into rinse water and rinsed.

13. The method of claim 7, wherein
in the return step, the residual air heated by the heat pump is further heated and returned to the coating drying oven.

14. The method of claim 7, wherein
the moisture contained in the mixed air has a weight absolute humidity of 21 g/kg or more,
the mixed air contains the volatile organic compound at a concentration of 500 ppmC or more,
the moisture contained in the residual air has a weight absolute humidity of 18 g/kg or less, and
the residual air contains the volatile organic compound at a concentration of 80 ppmC or less.

15. The method of claim 7, wherein
the water-soluble coating is an electrodeposition coating, and
the workpiece is carried into the coating drying oven after being subjected to a rinsing step in which the workpiece subjected to electrodeposition using the electrodeposition coating is immersed into rinse water and rinsed.

16. The method of claim 6, wherein
in the cooling recovery step, additional moisture is added into the mixed air.

17. A device for recovering a volatile organic compound in a coating drying oven into which a workpiece coated with a water-soluble coating is carried and which dries a coating film of the workpiece,
the coating drying oven including:
an evaporation zone into which the workpiece is carried and in which moisture of the workpiece is evaporated at a furnace temperature ranging from 80° C. to 120° C.; and
a curing zone arranged downstream of the evaporation zone so as to cure the coating film at a furnace temperature ranging from 150° C. to 200° C., the device comprising:
a first take-out passage communicating with the evaporation zone, the first take-out passage being for taking out first furnace air in the evaporation zone; and
a cooling recovery unit configured to cool the first furnace air and recover, as a condensate, the volatile organic compound contained in the first furnace air, together with the moisture,
wherein the water-soluble coating is an electrodeposition coating, and
the workpiece is carried into the coating drying oven after being subjected to a rinsing step in which the workpiece subjected to electrodeposition using the electrodeposition coating is immersed into rinse water and rinsed.

18. A device for recovering a volatile organic compound in a coating drying oven into which a workpiece coated with a water-soluble coating is carried and which dries a coating film of the workpiece,
the coating drying oven including:
an evaporation zone into which the workpiece is carried and in which moisture of the workpiece is evaporated at a furnace temperature ranging from 80° C. to 120° C.; and
a curing zone arranged downstream of the evaporation zone so as to cure the coating film at a furnace temperature ranging from 150° C. to 200° C., the device comprising:
a take-out passage communicating with the curing zone, the take-out passage being for taking out furnace air in the curing zone; and a cooling recovery unit configured to cool the furnace air taken out from the curing zone and recover, as a condensate, the volatile organic compound contained in the furnace air taken out from the curing zone, together with the moisture, wherein the cooling recovery unit includes a moisture feeder configured to add additional moisture into the cooling recovery unit.

19. A method of recovering a volatile organic compound in a coating drying oven into which a workpiece coated with a water-soluble coating is carried and which dries a coating film of the workpiece, the coating drying oven including:

an evaporation zone into which the workpiece is carried and in which moisture of the workpiece is evaporated at a furnace temperature ranging from 80° C. to 120° C.; and a curing zone arranged downstream of the evaporation zone so as to cure the coating film at a furnace temperature ranging from 150° C. to 200° C., the method comprising:

a first take-out step of taking out first furnace air in the evaporation zone; and a cooling recovery step of cooling the first furnace air and recovering, as a condensate, the volatile organic compound contained in the first furnace air, together with the moisture, wherein the water-soluble coating is an electrodeposition coating, and the workpiece is carried into the coating drying oven after being subjected to a rinsing step in which the workpiece subjected to electrodeposition using the electrodeposition coating is immersed into rinse water and rinsed.

20. A method of recovering a volatile organic compound in a coating drying oven into which a workpiece coated with a water-soluble coating is carried and which dries a coating film of the workpiece, the coating drying oven including:

an evaporation zone into which the workpiece is carried and in which moisture of the workpiece is evaporated at a furnace temperature ranging from 80° C. to 120° C.; and a curing zone arranged downstream of the evaporation zone so as to cure the coating film at a furnace temperature ranging from 150° C. to 200° C., the method comprising:

a take-out step of taking out furnace air in the curing zone; and a cooling recovery step of adding additional moisture into the furnace air taken out from the curing zone, cooling the furnace air taken out from the curing zone and recovering, as a condensate, the volatile organic compound contained in the furnace air taken out from the curing zone, together with the moisture and the additional moisture.

* * * * *